Aug. 30, 1932.  J. C. BUSH  1,874,440
PIPE SLIP
Filed Dec. 2, 1930
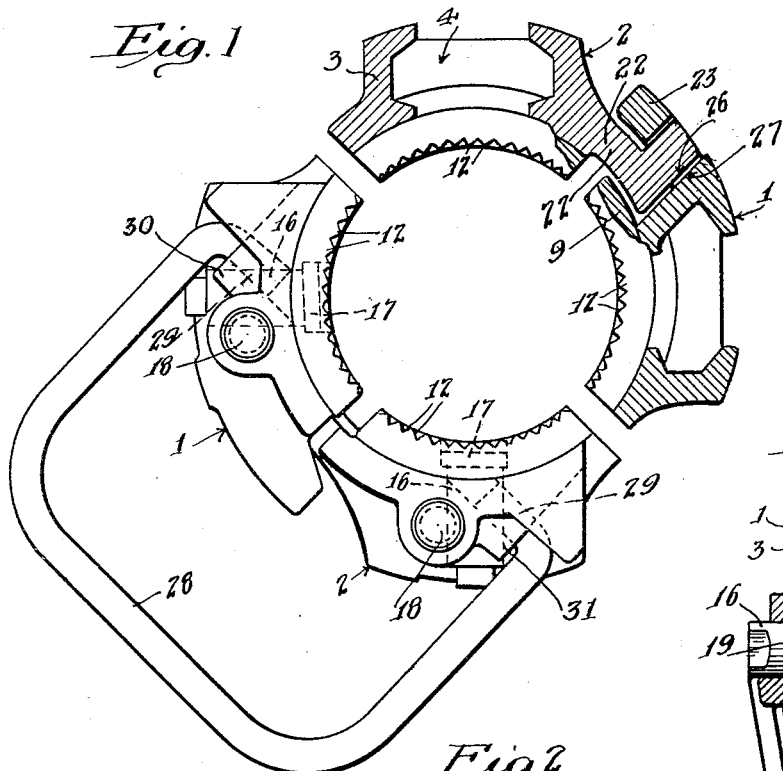
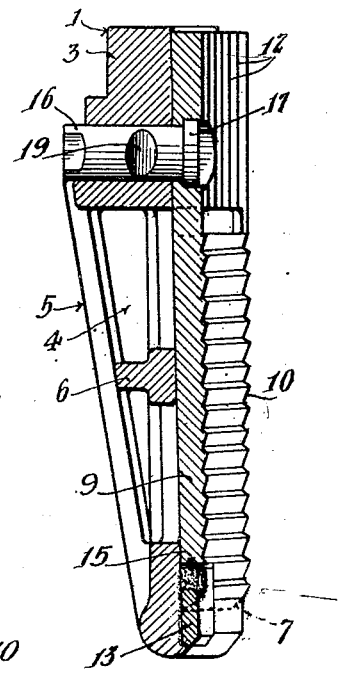
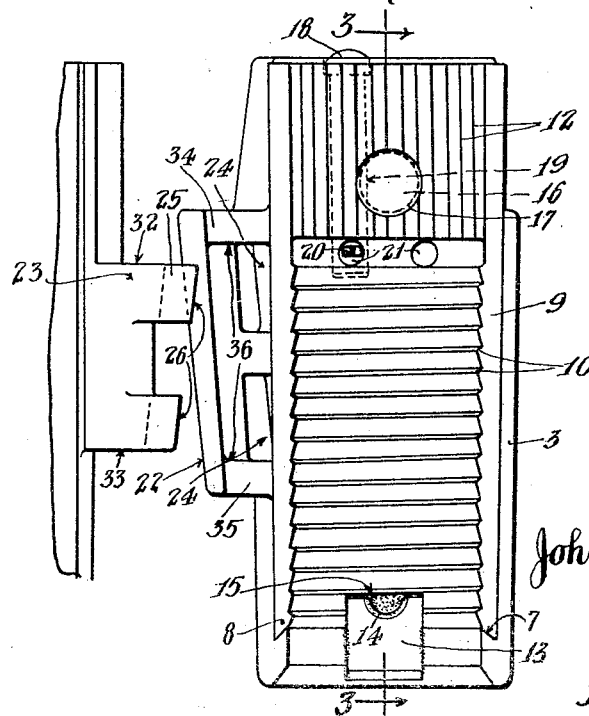
Inventor
John Charles Bush Patented Aug. 30, 1932

1,874,440

UNITED STATES PATENT OFFICE

JOHN CHARLES BUSH, OF ALIQUIPPA, PENNSYLVANIA, ASSIGNOR TO THE NATIONAL SUPPLY COMPANY, OF TOLEDO, OHIO, A CORPORATION OF OHIO

PIPE SLIP

Application filed December 2, 1930. Serial No. 499,512.

This invention relates to pipe slips, and more particularly to slips adapted for use in gripping a pipe for the purpose of either holding the same suspended or for rotating the same.

This invention is particularly addressed to an improvement over the pipe slips illustrated in the co-pending application of Forrest J. Young for pipe slips, filed May 22, 1929, Serial No. 365,080. In pipe slips of the duplex construction like that herein illustrated, or as illustrated in the co-pending application for Forrest J. Young above referred to, the pivoting of the slip segments on the vertical axis where the slip segments are joined to form the two duplex sections, must be limited to avoid the liability of the slips collapsing together when in position in a rotary machine to a point where they will drop through the bore of the rotary table and into the well.

An object of this invention is to provide pipe slips formed of a plurality of segments connected together in a manner to form two semi-cylindrical slips, the portions of which are held together in a manner to permit a limited movement of the segments together when the pipe is released and which means so limit the collapsing of the segments together as to prevent the falling of said slip segments through the bore of a rotary table.

Another object of this invention is to provide a duplex pipe slip including a plurality of segments connected together to form a semi-cylindrical slip connected together by interlocking members formed on the adjacent edges of the segments and locked together by means of spaced tongues formed from the adjacent edge of one of said slip segments fitting into spaced recesses formed on a projecting lug on the edge of the adjacent slip segment.

Other objects and advantages of this invention it is believed will be apparent from the following detailed description of a preferred embodiment thereof as illustrated in the accompanying drawing.

In the drawing:

Figure 1 is a plan view partly in section of pipe slips embodying this invention.

Figure 2 is a front elevation of one of the pipe slips embodied in this invention, a fragment of the mating slip being shown in position detached therefrom.

Figure 3 is a sectional side elevation taken substantially on the line 3—3 of Figure 2.

In the preferred embodiment of this invention illustrated in the accompanying drawing, 1 illustrates a female segmental pipe slip, and 2 a segmental male pipe slip. The segments 1 and 2 are connected together to form a semi-cylindrical pipe slip. The two pairs of segmental pipe slips 1 and 2 are provided to form a complete pipe slip. My invention, however, may be embodied in a pipe slip formed of more than two pairs of such segmental slips connected together in substantially the same manner. Each of the segmental slips 1 and 2 is of substantially the same construction and includes a body 3 which is cored out as indicated at 4 to lighten its weight, and is tapered downwardly on its exterior periphery as indicated at 5 to fit within the tapered bore of a rotary machine, elevator or the like. The segmental slips are preferably formed of cast metal, and in order to provide sufficient rigidity in the structure, a central bridge 6 is formed spanning the cored-out portion 4 from the front surface of the slip segment to the rear thereof.

At the lower portion each slip segment is formed with a downwardly tapered shoulder 7 into which the complementarily tapered end 8 of a liner 9 is fitted. The liner 9 is, by means of this shoulder 7, held from vertical displacement by the weight of the pipe.

Each of the liners 9 is provided with wickers 10 formed as thread segments and providing engaging teeth for engaging the outer periphery of the pipe. Each of the liners 9 is also provided with vertically extending wickers 12 formed to enable the slips to grip the pipe and rotate the pipe when the pipe slip is rotated as in a rotary machine. In order to hold the lower end of the liner 9 from rotating relative to the body of the slip, a key 13 is provided at the lower end of the slip which fits within a cut-out formed in the body 3 and is welded into position. The key 13 is cut out as indicated at 14 in order to provide additional welding surface for firmly holding the key in position. The liner 9 is provided with a substantially rectangular recess 15 at its lower end and the key 13 is slidingly fitted into this rectangular recess. A locking pin 16 is provided for holding the liner 9 from rotating relative to the body 3 at the upper end of the structure and for holding the liner 9 down against the shoulder 7. The locking pin 16 is provided with a head 17 which holds the liner 9 against the body 3. The head 17 is countersunk into the face of the liner 9 so as to be positioned below the wickers 12.

The pin 16 is locked in position by means of a pin 18 which passes downwardly through a vertical bore formed through the upper end of the body 3 and through a cut-out recess 19 formed in the shank of the pin 16. The pin 18 passing through the recess 19 holds the lock pin 16 from either rotation or displacement. A cotter pin 20 is passed through a hole formed in the end of the pin 18 through a hole 21 formed through the liner 9.

Means are provided for holding the slip segments 1 and 2 together to permit a limited pivotal movement and limited relative vertical and transverse displacements and to prevent the slip segments 1 and 2 from collapsing together to a position where they might fall through the bore of the rotary machine, elevator, or the like, within which the slips are mounted, and which means are preferably of the following construction:

Formed from the lateral face of the female slip segment 1 is a laterally extending tongue 22. Formed from the adjacent edge of the male slip segment 2 is a complementary tongue 23. The tongue 23 is formed from approximately the inner periphery of the male segment 2, while the tongue 22 is formed from the outer periphery of the female segment 1. The tongues 22 and 23 are thus formed in staggered relation so that when they are positioned in relation to each other, the tongue 23 overlaps the tongue 22.

The tongue 22 is formed with a pair of substantially rectangular recesses 24 into which complementary substantially rectangular lugs 25 formed from the rear surface of the tongue 23 are adapted to fit. The engaging surface 26 of the tongue 23 is tapered to provide an engaging surface which is parallel with the tapered lateral edge 27 of the female slip segment 1. The lugs 25 fitting within the recesses 24 permit a limited amount of vertical movement of the slip segment 1 in relation to the slip segment 2. The lugs 25 are of smaller dimensions than the recesses 24 and permit a slight pivotal, as well as a vertical and transverse movement, of the slip segments 1 and 2 relative to each other. The lugs 25 and the engaging tongues 22 and 23 are, however, so formed as to prevent the collapsing of the slip segments 1 and 2 inwardly a distance sufficient to permit the segments 1 and 2 to fall through the bore of the rotary machine or rotary table.

When the liner 9 of the slip segment 1 is in position, it fits over the tongues 23 holding the lugs 25 within the recesses 24. When it is desired to separate the slip segments 1 and 2, or to originally connect the tongues 22 and 23, the liner 9 is removed from the body 3 by removing the cotter pin 20, the pin 18, and the pin 16, and merely lifting the liner 9 from the body 3 of the slip 1.

As the slip segments 1 and 2 when connected together form a complete semi-cylindrical slip, a single handle 28 is provided. The handle 28 is formed as a bail and extends over the slip segments 1 and 2 and is provided at its ends with inwardly projecting trunnions 29 which fit within bosses 30 and 31 formed on the slip segments 1 and 2 respectively.

In order to limit the relative vertical movement of the slip segments 1 and 2, the tongue 23 is formed of a lesser length than the tongue 22. The tongue 23 when thus fitted within the tongue 22 has its upper and lower engaging ends 32 and 33 fitted within the end webs 34 and 35 of the tongue 22. Thus the inner adjacent faces 36 of the webs 34 and 35 define the limit of movement of the tongue 23 within the tongue 22. The slight vertical movement permitted between the slip segments 1 and 2 is provided to enable the slip segments 1 and 2 of the duplex slips thus formed to adapt themselves individually to the contour of the pipe being supported.

Having fully described my invention, it is to be understood that I do not wish to be limited to the details herein set forth, but my invention is of the full scope of the appended claims.

I claim:

1. In a device of the class described, the combination of a pair of slip bodies, tongues projecting from the adjacent edges of said slip bodies, a pair of spaced engaging lugs projecting transversely of the adjacent edge on one of said tongues, a pair of complementary spaced recesses formed in the tongue of the other said slip body to receive said lugs, and a slip liner secured to the latter said slip body in position to engage with the tongue of the first said slip body and hold the slip bodies from collapsing inwardly.

2. In a pipe slip, the combination of a pair of slip bodies, a male tongue extending from one edge of one of said bodies, a female tongue extending from the adjacent edge of the other said slip body, the male and female tongues having a pair of spaced interfitting lugs and recesses loosely connecting said slip bodies to permit a limited relative vertical movement of said slip bodies, and means secured to one of said slip bodies to engage the tongue of the other slip body to hold said slip bodies from collapsing inwardly.

3. In a pipe slip, the combination of a pair of arcuate slip bodies having tapered exterior surfaces, a male tongue extending from the inner surface of the edge of one slip body, a female tongue extending from the outer surface of the adjacent edge of the other slip body, the said tongues having complementary spaced lugs and recesses interfitting to permit relative pivotal and vertical movement of said slip bodies, and means secured to the inner face of the female tongue slip body in position to engage the male tongue and lock said tongues in engagement and to restrict the inward pivotal movement of said slip body.

4. In a pipe slip, the combination of a pair of slip bodies, a male tongue extending from one edge of one of said bodies and having a pair of spaced laterally extending lugs, a female tongue extending from the adjacent edge of the other slip body, the female tongue being adapted on its end to engage with the adjacent edge of the other slip body, and being provided with a pair of spaced recesses into which said lugs are adapted to fit, and a slip liner secured to the second mentioned slip body in position to engage with the male tongue and hold the said slip bodies from collapsing inwardly.

5. In a pipe slip, a pair of slip bodies, a male tongue extending from one edge of one of said bodies and having a laterally extending lug, a female tongue extending from the adjacent edge of the other slip body, the female tongue being adapted on its edge to engage with the other slip body, and being provided with a recess into which said lug is adapted to fit, and a slip liner secured to the latter said slip body in position to engage with the male tongue and hold the said slip bodies from collapsing inwardly.

Signed at Carnegie, Pennsylvania, this 19th day of November, 1930.

JOHN CHARLES BUSH.